United States Patent Office 2,992,985
Patented July 18, 1961

2,992,985
HYDROFORMING OF A NAPHTHA WITH A RHODIUM COMPOSITE CATALYST

Thomas F. Doumani, Los Angeles, and Hal C. Huffman, Long Beach, Calif., assignors to Union Oil Company of California, Los Angeles, Calif., a corporation of California
No Drawing. Filed Mar. 5, 1951, Ser. No. 214,022
13 Claims. (Cl. 208—138)

This invention relates generally to catalysts and catalytic processes for the conversion of hydrocarbons and hydrocarbon mixtures. More particularly, this invention relates to new and improved methods for the preparation of alumina-supported rhodium catalysts and especially to the preparation of rhodium-halogen-containing catalysts supported on alumina and to use of such catalysts in the reforming of hydrocarbons and hydrocarbon mixtures.

The present trend in catalytic reforming of gasoline stocks is toward non-regenerative catalysts which may be employed for periods up to six months without regeneration by oxidation. The non-regenerative processes have the advantage of requiring smaller equipment and lesser amounts of catalyst for a given throughput of feed stock since no off-stream time is required for regeneration.

Platinum has been employed for the catalyst in such non-regenerative processes but possesses a distinct disadvantage in its relatively low heat stability. Thus at temperatures as low as 1200° F. a platinum-alumina catalyst is substantially completely destroyed. The low heat stability is indicative of a relatively rapid decline of activity at the operating temperatures, e.g., 900° F.

Hydrofluoric acid as well as numerous other acids have been employed in the prior art in the preparation of catalysts and carriers for catalysts. In some cases the material is treated to replace a metal ion, such as calcium or sodium, with a hydronium ion as in the activation of naturally occurring montmorillonite clays for cracking catalysts. In other cases various sands or clays may be treated to dissolve a part or all of one of the components thereof. Thus sands may be treated with hydrofluoric acid in order to dissolve a substantial part, e.g., 5 to 80% by weight of the sand and thereby increase the catalytic surface per unit weight of material. In all such cases there is a general decrease in the weight of the treated material as compared to the untreated. The treated material is normally exhaustively washed to remove the contaminating anions introduced by the acid treatment, prior to its use for catalytic purposes. In some cases the hydrofluoric acid treated carrier is neutralized with ammonia and heated to vaporize the ammonium fluoride formed thereby.

Thus where hydrofluoric acid treatment has been employed in the literature, the fluorine has been removed by washing, vaporization as ammonium fluoride, etc.

It has now been found that certain alumina-supported rhodium catalysts are considerably more heat stable than the corresponding platinum catalysts. Rhodium-alumina is considerably more heat stable than is a platinum-alumina catalyst containing about the same concentration of catalytic agent. It has been found that the activity of rhodium-alumina-halogen catalyst is comparable, if not somewhat superior, to the corresponding platinum-alumina-halogen catalyst. Furthermore the highly active rhodium-alumina-halogen catalyst possesses a superior heat stability when compared to the platinum counterpart.

In the truly non-regenerative processes no provision is made for even occasional regeneration by oxidation with air to combust the accumulated deposits. The low heat stability of platinum-supported catalysts militates against any such regeneration whatsoever. The new rhodium catalyst, because of their higher heat stability, may be subjected to such occasional regenerations, or they may be employed non-regeneratively for long periods at high sustained activity.

It is an object of this invention to provide thermally stable rhodium-alumina catalysts which may be employed in either non-regenerative or periodically regenerative hydrocarbon conversion processes such as in the catalytic reforming of gasoline.

It is another object of this invention to provide a method for promoting the activity of certain rhodium catalysts whereupon a highly active catalyst is obtained which possesses good thermal stability.

It is another object of this invention to provide a process for catalytically reforming gasolines with rhodium catalysts of improved activity wherein long on-stream periods between regenerations may be employed.

It is another object of this invention to provide a method for impregnating an alumina carrier with rhodium impregnation solutions so as to produce a catalyst of improved activity and thermal stability.

Other objects and advantages of this invention will become apparent to those skilled in the art as the description thereof proceeds.

Briefly this invention relates to the preparation and use of certain alumina-supported rhodium catalysts and to the preparation and use of certain alumina-supported rhodium catalysts which are promoted with inorganic fluorine or chlorine compounds.

It has been found that catalysts having high thermal stability can be prepared by impregnating high surface area alumina supports of high purity with rhodium salts. Highly purified alumina such as gel type alumina gives a highly thermally stable catalyst. Other catalyst carriers such as silica, activated carbon, celite and the like are entirely unsuited for supporting rhodium and yield materials which have almost no activity whatsoever for gasoline reforming.

It has also been found that the activity of rhodium catalysts is improved by the use of relatively short impregnation periods. Thus catalysts prepared by soaking the activated alumina carrier in the rhodium impregnation solutions for periods of only 2 to 20 minutes are considerably more active than those prepared using the conventional longer catalyst impregnation times. The shorter impregnation periods results in a greater distribution of the rhodium near the surface of the catalyst particle and lesser amounts of rhodium near the core of the particle. Analytical data show the highly active catalysts prepared by this technique have rhodium contents on the outer surface which are as much as 5-10 times the rhodium content of the central core of the catalyst particle when the particle is in the form of ⅛" diameter pills which are ⅛" long.

Catalysts prepared by these methods are highly heat stable but sometimes possess reforming activities which are inferior to those of platinum catalysts. It has been found that the activity of these catalysts can be brought to equivalency or even superiority to the platinum catalysts by the inclusion of small amounts of halogens and particularly by the inclusion of fluorine or chlorine. The amount of halogen must be controlled within a relatively small range since high concentrations of halogen markedly depress the activity. The heat stability of the rhodium catalysts is not impaired by the inclusion of the halogen moreover. Such halogen may be introduced by impregnating the carrier with either a rhodium halogen-containing compound such as rhodium chloride, rhodium fluoride and the like. Preferably, the halogen is introduced by impregnating the carrier before or after inclusion of the rhodium with a halogen-containing compound and preferably a halogen-containing acid.

In the preparation of the halogen-promoted catalyst the fluorine or chlorine compound is deposited upon the carrier by impregnating with an aqueous solution of an inorganic halogen-containing acid, for example hydrofluoric acid, either before or after inclusion or impregnation of the rhodium. In the preparation of such catalysts the adsorbent carrier consists essentially of alumina.

In one modification of the invention the halogen-containing acid may be deposited upon the carrier by impregnating the adsorbent carrier with an aqueous solution of the acid. After the wet carrier has been drained, dried and heated to elevated temperatures for a short period of time, the rhodium is deposited thereon by a conventional impregnation procedure.

In another modification of the invention, the rhodium, is first deposited upon the carrier, such as by impregnation in one or more impregnation steps, by coprecipitation, by co-pilling, or other such methods of catalyst preparation. Following the deposition of the rhodium, the carrier is converted to an adsorbent form and is then immersed in an aqueous solution of a halogen-containing acid, drained, dried, and activated by heating to elevated temperatures such as from 800° F. to 1000° F. for two to six hours for example.

In still another method of catalyst preparation the hydrofluoric acid or other halogen-containing acid may be incorporated in the rhodium impregnating solution and co-impregnated therewith.

The carriers which are suitable and which may be employed for distending the mixtures of rhodium with, or without, halogens according to the process of this invention comprise alumina, and high surface area inorganic oxides containing a major proportion of alumina. It appears possible that the active catalytic agent in the catalysts of this invention may even be a kind of loose compound between alumina and rhodium metal compound. Thus numerous other catalyst supports have been found to be entirely unsuited for the production of rhodium catalysts including silica, activated carbon, and celite. The preferred carrier is activated, gel-type alumina. Alumina gels containing between about 1% and 15% and preferably between about 3% and 8% of coprecipitated silica are especially suitable carriers. The presence of the small amount of silica in the alumina appears to stabilize the resulting catalyst and prolongs the catalyst life as is described in U.S. Patent 2,437,532.

Prior to the impregnation steps, the carrier is normally shaped into the physical form desired for the catalyst. For this purpose the dried carrier is usually ground, mixed with a lubricant such as graphite or hydrogenated vegetable oil, and pilled. In the activation of the carrier by heating the lubricant is removed by combustion. Alternatively the carrier may be used in granular form; or it may be ground into powder, made into a paste and extruded. Where the catalyst is to be employed in a fluidized process, such as in fluidized desulfurization, denitrogenation, and the like, the carrier is formed into a finely divided state as in micro-bead form, or it is ground into a fine state and is thereafter impregnated. In the case of fluidized processes the carrier can be impregnated in larger form, e.g. granules, pills, etc., and thereafter ground to the desired powder size for the processing.

In the preferred method for preparing a halogen-impregnated catalyst of this invention, the halogen is first deposited upon the carrier. In the preferred method the halogen-containing acid, which is preferably a fluorine-containing acid such as hydrofluoric acid, is first impregnated on a carrier and following a suitable activation the carrier is reimpregnated with rhodium which after decomposition yields the finished catalyst.

In the preparation of a carrier for impregnation with hydrofluoric acid, the activation step is carried out by heating the carrier in order to render it sufficiently adsorbent for impregnation. This activation may be effected by heating from two to six hours at 600° F. to 1000° F. for example. Often, activation temperatures as low as about 500° F. may be employed. After the carrier has been cooled, it is immersed in the acid impregnation solution.

A part of the impregnation solution is adsorbed by the carrier, and the non-adsorbed excess solution is removed after a suitable impregnation period such as between about ten minutes and one hour. The impregnated carrier after draining is dried in a low temperature oven which may be maintained between 180° F. and 230° F., for example, in order to remove the bulk of the water. This acid-impregnated carrier is thereafter activated by heating to a temperature between about 600° F. and 1000° F. for two to six hours, for example, in order to condition the carrier for the subsequent rhodium impregnation.

In certain cases a series of halogen-containing acid impregnations may be made in order to obtain a suitably high content of halogen on the finished catalyst.

The acid impregnation solution according to the method of this invention may be prepared from fluorine-containing inorganic acids such as hydrofluoric acid, fluorosulfonic acid and fluorosilicic acid and the like. Where chlorine-containing acids are employed, hydrochloric acid, chlorosulfonic acid and the like may be employed.

In general the fluorine or chlorine retained by the carrier varies directly with the concentration of the impregnating solution. With the use of alumina carriers it has been found that the preparation of catalysts containing between 0.2% and 5% by weight of fluorine or chlorine required impregnating solutions containing between about 0.4 and 10.4 grams of fluorine (as F) or chlorine (as Cl) per 100 ml. of solution.

While other concentrations of fluorine or chlorine may sometimes be employed, we generally employ between about 0.05% and 5% of fluorine or chlorine and we prefer to employ between about 0.2% and 3% of fluorine or chlorine based upon the finished catalyst.

In the impregnation with rhodium the activated carrier is immersed in the rhodium impregnation solution for a short time preferably, such as between about 2 minutes and 20 minutes. It has been found that long impregnation times cause a uniform penetration of the rhodium salt into the core of the particle. While a uniform penetration of the impregnation solution is normally desirable in the preparation of catalysts, it has been found in the particular case of rhodium that it is desirable to employ short impregnation times so as to prevent uniform impregnation and absorption of the solution. It has been found that where the rhodium is relatively more concentrated on the surface of the catalyst carrier particles that a favorable increase of activity is obtained thereby permitting more efficient utilization of the rhodium when employed in small concentrations. This is especially the case where a large size of catalyst pellets or lumps is involved, such as spheres, granules, etc., larger than 1/8 inch.

After immersion in the impregnation solution a part of the impregnation solution is adsorbed by the carrier and the excess solution is thereafter removed. The impregnated carrier after draining and drying in a low temperature oven such as at 180° F. to 230° F., for example, is finally activated by heating to a temperature of 600° F. to 1000° F. for two to six hours.

The rhodium-containing impregnation solution is selected from water-soluble rhodium salts such as rhodium chloride, rhodium sulfate, rhodium nitrate, rhodium phosphate and the like. The concentration of rhodium in the solution will depend upon the particular carrier being employed and upon the desired concentration of rhodium in the finished catalyst. Where a finished catalyst comprising between about 0.001 and 0.5% of Rh is desired, the rhodium-containing impregnation solutions will be a concentration of rhodium ranging from about 0.002 to 1.0 grams of Rh/100 ml.

While catalysts prepared by the method of this invention may be prepared which contain different percentages of rhodium, those containing between about 0.001 and 0.5% by weight and preferably between about 0.01 and 0.3% of rhodium calculated as Rh are most generally employed.

While it has been found that a more active catalyst is generally obtained when the halogen impregnation step precedes the rhodium impregnation step, it is sometimes desirable to employ the less active catalyst. In such a case the sequence of impregnations described hereinbefore is simply reversed. Solutions of approximately the same strength are employed to give a catalyst of a given composition in general regardless of the impregnation order.

Where the hydrofluoric acid impregnation step follows the deposition of the rhodium, methods other than impregnation may be used for the deposition of the rhodium. Thus although the impregnation method described hereinbefore is the preferred method we may employ such other methods as coprecipitation, copilling and the like. In one method of coprecipitation, for example, a water-soluble salt of rhodium dissolved in water is added to a wet purified hydrogel of alumina thereby causing precipitation, absorption and the like of the rhodium salt on the hydrogel. The hydrogel containing the rhodium salt is then dried and heated to 800° F. whereupon it becomes adsorbent and may be employed for impregnation with hydrofluoric acid in the manner described hereinbefore.

The finished catalysts of this invention are useful for effecting the reforming of gasoline boiling range hydrocarbon stocks in order to improve the octane rating, decrease the gum-forming tendencies, effect mild desulfurization, isomerization, dehydrogenation, hydrogenation and otherwise improve the stock. Such reactions are carried out in the presence of hydrogen at temperatures in the range of 700° F. to 1000° F. and preferably in the range of about 850° F. to 950° F. Under the reaction conditions hydrogen is produced which is customarily recycled with the incoming feed stock. The reaction is carried out at pressures between about atmospheric and 2000 p.s.i. and preferably in the range of 50 p.s.i. to 1000 p.s.i. The feed rate may vary between about 0.2 and 10.0 volumes of liquid feed stock per volume of catalyst per hour and between about 500 and 10,000 cubic feet of recycle hydrogen is employed per barrel of feed.

These reactions may be carried out in a single catalyst case or in a plurality of catalyst cases either in series or in parallel, or alternatively the catalyst may be employed in moving bed, fluidized bed or other such types of catalytic processes.

During usage small amounts of deposit comprising mostly carbon, nitrogen and sulfur compounds accumulate on the catalyst. The slow build-up of such deposit is not serious and does not impair the catalyst activity for a considerable period of time. Because of the relatively good heat stability of the catalyst such deposit may be removed from time to time as the activity declines by combustion with air at controlled oxidation temperatures such as below 1100° F. Such regnerations destroy the activity of platinum catalyst because of their lower heat stability. Normally the catalysts of this invention are employed for periods of several months between regenerations. After regeneration the catalyst is reduced with hydrogen prior to its employment for hydrocarbon conversions.

Perhaps the process of this invention is best illustrated by the following specific examples:

*Example 1*

An alumina-silica gel containing 95% $Al_2O_3$ and 5% $SiO_2$ was prepared by coprecipitation of an aqueous mixture of sodium aluminate and sodium silicate with carbon dioxide. The precipitate was washed until substantially free of sodium ions, dried at 200 to 220° F. and activated by heating for two hours at about 1000° F.

A rhodium chloride impregnation solution is prepared by dissolving 0.358 gram of $RhCl_3.4H_2O$ in 60 grams of distilled water. About 109 grams of the dried silica-alumina gel was immersed in the impregnation solution for about 15 minutes, drained, dried at about 250° F. and activated by heating slowly to about 900° F. The finished catalyst contained about 0.1% by weight of rhodium calculated as Rh. This catalyst was designated catalyst No. 1.

In the preparation of catalyst No. 2 about 109 grams of the silica-alumina gel was immersed in an impregnation solution prepared by dissolving about 1.08 grams of 52% HF in 62 ml. of distilled water, drained and dried. The HF impregnated carrier containing about 0.5% by weight of HF was then impregnated with 50 ml. of an aqueous solution containing 0.358 gram of $RhCl_3 \cdot 4H_2O$ during 15 minutes soaking time. The impregnated gel was drained, dried and activated as in the preparation of catalyst No. 1. The finished catalyst contained about 0.1% rhodium and 0.5% of HF.

For testing these catalysts gasoline stock boiling substantially in the range of between 200° F. and 400° F. obtained by distillation of a California crude was employed. The gasoline contained about 12% aromatics and had an F-1 clear octane rating of 66 which increased to 78 upon the addition of 3 ml. of tetraethyl lead fluid.

The two catalysts were then tested under the following reaction conditions:

| | |
|---|---|
| Temperature, ° F. | 900 |
| Pressure, p.s.i. | 450 |
| Process time, hours | 4 |
| Liquid hourly space velocity | 2.0 |
| Hydrogen addition, cu. ft./barrel of feed | 5000 |

The following analytical data were obtained on the products from the two catalysts:

| Catalyst | 1 | 2 |
|---|---|---|
| Liquid Product: | | |
| Volume percent of feed | 92.3 | 90.2 |
| Octane Rating F-1— | | |
| Clear | 79.5 | 82 |
| 3 ml. TEL fluid | 92.5 | 93.5 |
| Gaseous Product, cu. ft./barrel of feed: | | |
| $H_2$ | 448 | 487 |
| $C_1-C_3$ | 70 | 62 |

It is apparent that a superior liquid product is obtained when the rhodium catalyst is promoted with fluorine and also that a greater yield of gas containing a higher percentage of hydrogen is obtained with the fluorine treated actalyst.

Similarly favorable results are obtained when the rhodium content is 0.05% and also when the rhodium content is 0.2%.

When the preparation of either catalyst 1 or catalyst 2 is repeated using either silica gel or activated carbon, it is found that the activities of the thus prepared catalyst is substantially nil. The clear octane rating of the liquid products from such catalysts is less than 69 and in some cases was less than the feed. These changes, if any, are attributable to non-catalytic reforming. When the impregnation time was increased to 30 minutes in the case of catalysts 1 and 2, the activity decreased.

When substantially pure alumina gel is substituted for the alumina-silica gel in the foregoing catalysts, substantially the same results are obtained.

*Example II*

Catalyst 3 was prepared acording to the method employed for catalyst 2 of Example I with the exception that the concentration of the rhodium chloride impregnation solution was doubled so as to give a catalyst containing 0.2% of rhodium and 0.5% of HF.

A platinum catalyst (designated catalyst 4) was prepared according to the method employed for catalyst 3 using chloroplatinic acid $H_2PtCl_6 \cdot 6H_2O$ in place of the rhodium chloride.

Catalyst 4, like catalyst 3, contained about 0.5% by weight of HF and 0.2% by weight of noble metal. The two catalysts were then tested for reforming the feed stock of Example I after they had been heated to 900° F. during the preparation. In order to evaluate the relative heat stabilities of the two catalysts portions were heated to 1200° F. for 21 hours in air and the activities were redetermined. The following data were obtained for the fresh catalysts (900° F.) and the 1200° F. heat treated samples.

| Catalyst | Rhodium | | Platinum | |
|---|---|---|---|---|
| Heat Treatment, ° F | 900 | 1,200 | 900 | 1,200 |
| Liquid Product: | | | | |
| Volume percent of feed | 90.2 | 93.9 | 88.4 | 97.2 |
| Octane Rating F-1— | | | | |
| Clear | 87.5 | 78.5 | 88 | 67 |
| 3 ml. of TEL fluid | 97 | 92.5 | 97 | 85 |
| Gaseous Product, cu. ft | 793 | 299 | 817 | 3 |

The foregoing data show that the fresh 900° F. fluoride-rhodium catalyst compares in activity to the fresh 900° F. platinum catalyst. After heating at 1200° F. the platinum catalyst is almost completely destroyed. The rhodium catalyst on the other hand has only been partially destroyed. X-ray diffraction measurements of these and other similarly heat treated samples at various temperatures show that the rate of crystal growth in the platinum appears at lower temperatures is much more rapid at a particular temperature. These data show that rhodium gives a more heat stable catalyst than does platinum. Experience has shown that the more heat stable catalyst generally retain their activity for longer periods during commercial usage.

Similarly favorable results are obtained when hydrochloric acid is substituted for the hydrofluoric acid.

Substantially the same results are obtained when substantially pure alumina gel is substituted for the alumina-silica gel in the foregoing series of catalysts.

*Example III*

In the preparation of catalyst No. 5 the method of catalyst 1 was repeated with the exception that the wet impregnated catalyst, after draining, was treated with a current of hydrogen sulfide in order to sulfide the catalyst. Catalyst No. 5 was then compared with catalyst No. 1 under the following reaction conditions with the feed stock of Example I:

Temperature, ° F. _____ 900
Pressure, p.s.i.g. _____ 450
Process time, hours _____ 4
Liquid hourly space velocity _____ 2.0
Hydrogen addition, cu. ft./barrel of feed _____ 5000

The following data were obtained comparing unsulfided catalyst No. 1 and sulfided catalyst No. 5.

| Catalyst | 1 | 5 |
|---|---|---|
| Liquid Product: | | |
| Volume percent of Feed | 92.3 | 93.3 |
| Octane Rating F-1— | | |
| Clear | 79.5 | 77 |
| 3 ml. TEL Fluid | 92.5 | 90 |
| Gaseous Product, cu. ft./barrel of feed: | | |
| $H_2$ | 448 | 358 |
| $C_1$-$C_3$ | 70 | 91 |

It is apparent from the data for gas make that the unsulfided rhodium catalyst is roughly 25% more active than the corresponding sulfided catalyst.

When the preparation of catalyst 5 is repeated using an HF impregnated alumina-silica used in the preparation of catalyst 2, the activity is improved and it is then superior to catalyst 1 under the foregoing testing conditions.

*Example IV*

A highly purified alumina gel was prepared by precipitating aluminum nitrate with ammonium hydroxide and subsequently washing to remove impurities. The resulting gel contained about 14.4% by weight of solids. About 0.472 gram of $RhCl_3 \cdot 4H_2O$ was dissolved in about 100 ml. of water and this solution was mixed with about 1200 parts by weight of the wet gel at room temperature. The mixture was then dried on a steam bath, ground, mixed with 6% by weight of a pelleting mixture consisting of one part by weight of hydrogenated vegetable oil and two parts by weight of graphite. The pills were heated slowly to 900° F. to accomplish the activitation. The catalyst obtained thereby was designated to be catalyst No. 6 and contained about 0.1% by weight of rhodium as Rh.

The precipitated gel catalyst No. 6 was then compared with impregnated catalyst No. 1 for processing the gasoline stock of Example I under the following conditions:

Temperature, ° F. _____ 900
Pressure, p.s.i.g. _____ 450
Process time, hours _____ 4
Liquid hourly space velocity _____ 2.0
Hydrogen addition, cu. ft./barrel of feed _____ 5000

The following comparative data were obtained:

| Catalyst | 1 | 6 |
|---|---|---|
| Liquid Product: | | |
| Volume percent of Feed | 92.3 | 93.0 |
| Octane Rating F-1— | | |
| Clear | 79.5 | 75 |
| 3 ml. TEL fluid | 92.5 | 90 |
| Gaseous Product, cu. ft./barrel of feed: | | |
| $H_2$ | 448 | 219 |
| $C_1$-$C_3$ | 70 | 76 |

The foregoing data show that a catalyst having higher activity is prepared by impregnation rather than by coprecipitation.

When catalyst 6 is impregnated with hydrofluoric acid by immersing about 100 grams of the catalyst in 1 gram of 52% HF in 58 ml. of distilled water, drained and dried, the catalyst is estimated to contain 0.5% HF and the activity is then substantially the same as catalyst 1. Thus coprecipitated rhodium catalysts may be promoted by hydrofluoric acid impregnation.

In broad aspect this invention relates to a new catalyst for the catalytic reforming of gasoline stocks which contain rhodium supported on a carrier consisting essentially of alumina. These rhodium catalysts are highly heat stable and when prepared by impregnation, and especially by the short-time impregnation method, they possess high activity. This activity may be further improved by the inclusion of halogen containing acids such as hydrofluoric acid, hydrochloric acid and the like.

It is apparent that the "impregnation" with hydrofluoric acid, and other halogen-containing acids, as practiced in this invention is markedly different from the "treatment" of various clays and other catalytic materials with hydrofluoric acid in the prior art. Impregnation is used to denote throughout this disclosure and in the claims the wetting of an adsorbent material with a solution whereby the material adsorbs a part of the solution and retains it. The wetting of the adsorbent with solution may be carried out very rapidly using times as short as a few minutes but more often employing 30 minutes, for example. After adsorption of the solution, the wetted material is dried whereupon it retains elements of the impregation solution, e.g. combined fluorine or chlorine. Furthermore, the amount of fluorine or chlorine retained by the adsorbent in general varies as a direct function of the concentration of the impregnation solution.

"Acid treatment" on the other hand almost always involves a loss of weight of the material and is usually followed by washing to remove the acid retained by the material. Acid treatment usually includes a long period of digestion with the acid in order for the acid to effect the leaching, etching, or other action.

The foregoing disclosure of this invention is not to be considered as limiting since many variations may be made by those skilled in the art without departing from the scope or spirit of the following claims.

We claim:

1. A hydrocarbon conversion catalyst comprising a major proportion of an activated gel-type alumina carrier, between about 0.001% and 0.5% by weight of rhodium and between about 0.05% and 5% by weight of a halogen selected from the group consisting of fluorine and chlorine, said rhodium having been deposited by impregnating said carrier with an aqueous solution of a rhodium compound and subsequently decomposing said rhodium compound by heating, said halogen having been deposited by impregnating said carrier with an inorganic halogen containing acid.

2. The catalyst of claim 1 wherein said carrier is substantially pure alumina.

3. The catalyst of claim 1 wherein said carrier comprises coprecipitated silica-alumina gel containing between about 1% and 15% by weight of silica and between about 85 and 99% by weight of alumina.

4. A process for the catalytic hydroforming of gasoline which comprises contacting said gasoline, in admixture with between about 500 and 10,000 s.c.f. of hydrogen per barrel of feed, with a catalyst comprising a major proportion of an activated gel-type alumina carrier and a minor proportion of rhodium, said contacting being carried out at a temperature between about 700° and 1000° F., a pressure between about 0 and 2000 p.s.i.g. and a feed rate between about 0.2 and 10 liquid volumes per volume of catalyst per hour.

5. A process as defined in claim 4 wherein said carrier contains between about 1% and 15% by weight of silica.

6. A process for the catalytic hydroforming of gasoline which comprises contacting said gasoline, in admixture with between about 500 and 10,000 s.c.f. of hydrogen per barrel of feed, with a catalyst comprising a major proportion of an activated gel-type alumina carrier, a minor proportion of rhodium, and impregnated thereon between about 0.05% and 5% by weight of a halogen selected from the class consisting of fluorine and chlorine, said contacting being carried out at a temperature between about 700° and 1000° F., a pressure between about 0 and 2000 p.s.i.g. and a feed rate between about 0.2 and 10 liquid volumes per volume of catalyst per hour.

7. A process as defined in claim 4 wherein said carrier contains between about 1% and 15% by weight of silica.

8. A process as defined in claim 4 wherein said carrier is first impregnated with a halogen-containing acid to provide said halogen, and is thereafter impregnated with a solution of a rhodium-containing compound to provide said rhodium.

9. A process as defined in claim 4 wherein said carrier is first impregnated with a solution of a rhodium-containing compound to provide said rhodium, and is thereafter impregnated with a halogen-containing acid to provide said halogen.

10. A process as defined in claim 4 wherein said catalyst has been prepared by first impregnating said carrier in granular form with an aqueous halogen-containing acid selected from the class consisting of chlorine and fluorine-containing acids, draining and drying the halogen-impregnated carrier, thereafter impregnating the same with a solution of a rhodium-containing compound for a length of time controlled to deposit a substantially greater concentration of rhodium near the exterior surfaces of said carrier granules than is absorbed into the core of said carrier granules, and thereafter draining, drying and calcining the twice-impregnated catalyst at a temperature between about 600° and 1000° F. to activate the same.

11. A method for preparing a hydroforming catalyst which comprises first impregnating a granular activated alumina carrier with an aqueous halogen-containing acid selected from the class consisting of chlorine and fluorine-containing acids, draining and drying the halogen-impregnated carrier, thereafter impregnating the same with a solution of a rhodium-containing compound for a length of time controlled to deposit a substantially greater concentration of rhodium near the exterior surfaces of said carrier granules than is absorbed into the core of said carrier granules, and thereafter draining, drying and calcining the twice-impregnated catalyst at a temperature between about 600° and 1000° F. to activate the same.

12. A hydrocarbon conversion catalyst comprising a major proportion of an activated gel-type alumina carrier, between about 0.001% and 0.5% by weight of rhodium and between about 0.05% and 5% by weight of a halogen selected from the group consisting of fluorine and chlorine.

13. A hydrocarbon conversion catalyst comprising a major proportion of an activated gel-type alumina carrier, between about 0.001% and 0.5% by weight of rhodium and between about 0.05% and 5% by weight of a halogen selected from the group consisting of fluorine and chlorine, said rhodium having been deposited by coprecipitating an insoluble compound thereof with said alumina and subsequently decomposing said rhodium compound by heating, said halogen having been deposited by impregnating said carrier with an inorganic halogen-containing acid.

References Cited in the file of this patent

UNITED STATES PATENTS

| | | |
|---|---|---|
| 2,184,235 | Groll et al. | Dec. 19, 1939 |
| 2,259,423 | Kirkpatrick | Oct. 14, 1941 |
| 2,426,118 | Parker et al. | Aug. 19, 1947 |
| 2,437,531 | Huffman | Mar. 9, 1948 |
| 2,478,916 | Haensel et al. | Aug. 16, 1949 |
| 2,479,109 | Haensel | Aug. 16, 1949 |
| 2,479,110 | Haensel | Aug. 16, 1949 |
| 2,503,641 | Taylor et al. | Apr. 11, 1950 |
| 2,550,531 | Ciapetta | Apr. 24, 1951 |
| 2,560,329 | Brandon | July 10, 1951 |
| 2,606,159 | Owen | Aug. 5, 1952 |